US012031392B2

(12) United States Patent
Nield et al.

(10) Patent No.: US 12,031,392 B2
(45) Date of Patent: Jul. 9, 2024

(54) INTERLOCK FOR A DRILL RIG AND METHOD FOR OPERATING A DRILL RIG

(71) Applicants: Barry J. Nield, Jacksonville Beach, FL (US); George A. Nield, Jacksonville Beach, FL (US)

(72) Inventors: Barry J. Nield, Jacksonville Beach, FL (US); George A. Nield, Jacksonville Beach, FL (US)

( * ) Notice: Subject to any disclaimer, the term of this patent is extended or adjusted under 35 U.S.C. 154(b) by 63 days.

(21) Appl. No.: 17/828,183

(22) Filed: May 31, 2022

(65) Prior Publication Data

US 2023/0383613 A1 Nov. 30, 2023

(51) Int. Cl.

| | |
|---|---|
| ***E21B 19/00*** | (2006.01) |
| ***B66D 5/30*** | (2006.01) |
| ***E21B 33/06*** | (2006.01) |
| ***E21B 47/06*** | (2012.01) |
| ***E21B 47/09*** | (2012.01) |

(52) U.S. Cl.

CPC .............. *E21B 19/008* (2013.01); *B66D 5/30* (2013.01); *E21B 33/063* (2013.01); *E21B 47/06* (2013.01); *E21B 47/09* (2013.01)

(58) Field of Classification Search

CPC ....... E21B 19/008; E21B 33/063; E21B 47/09
See application file for complete search history.

(56) References Cited

U.S. PATENT DOCUMENTS

| | | | | |
|---|---|---|---|---|
| 7,274,989 | B2 * | 9/2007 | Hopper | E21B 47/09 702/6 |
| 10,623,703 | B2 * | 4/2020 | Pettersen | G08B 13/19689 |
| 10,907,463 | B2 * | 2/2021 | Zheng | E21B 33/063 |
| 10,968,731 | B2 | 4/2021 | Gupta et al. | |
| 11,066,892 | B2 | 7/2021 | Gallagher et al. | |
| 11,078,742 | B2 | 8/2021 | Park et al. | |
| 11,098,708 | B2 | 8/2021 | Schmitt et al. | |
| 11,111,751 | B1 | 9/2021 | Couren et al. | |
| 11,118,416 | B2 | 9/2021 | Vu | |
| 11,156,054 | B2 | 10/2021 | Alsup et al. | |
| 11,156,056 | B2 | 10/2021 | McCormick et al. | |
| 11,168,530 | B2 | 11/2021 | Oag et al. | |
| 11,180,967 | B2 | 11/2021 | Pedersen et al. | |
| 11,187,052 | B2 | 11/2021 | Angstmann et al. | |
| 11,203,909 | B2 | 12/2021 | Maher et al. | |
| 11,242,722 | B2 | 2/2022 | Buffarini et al. | |

* cited by examiner

*Primary Examiner* — Catherine Loikith

(74) *Attorney, Agent, or Firm* — Steve LeBlanc, LLC

(57) ABSTRACT

An interlock between a drawworks and a blowout preventer includes a sensor for sensing a position of the blowout preventer. An interlock signal is generated by the sensor, and the interlock signal is reflective of the position of the blowout preventer. A lock operably connected to the drawworks receives the interlock signal and disables operation of the drawworks if the interlock signal meets a predetermined criterion. A method for operating a drill rig includes operating a drawworks to raise and lower a drill string and operating a blowout preventer. The method further includes sensing a position of the blowout preventer and generating an interlock signal that reflects the position of the blowout preventer. The method further includes comparing the interlock signal to a predetermined criterion and disabling the drawworks if the interlock signal meets the predetermined criterion.

16 Claims, 5 Drawing Sheets

INTERLOCK FOR A DRILL RIG AND METHOD FOR OPERATING A DRILL RIG

FIELD OF THE INVENTION

The present invention generally involves an interlock for a drill rig and a method for operating the drill rig. Particular embodiments of the present invention may be incorporated into land-based or offshore drill rigs used for oil/gas production and/or well service operation to reduce or prevent personnel injury or equipment damage when changing the length of a drill string.

BACKGROUND OF THE INVENTION

Drill rigs are commonly used in oil and gas production and well service operations to bore substantial distances below the earth's surface. FIG. 1 provides a representative drawing of a drill rig 10 according to one embodiment of the present invention. As shown in FIG. 1, the drill rig 10 generally includes a drawworks 12 and associated derrick 14 for raising and lowering a drill string 16 in a wellhead 18. The drawworks 12 generally includes a cable 20 wound around a drum 22. The cable 20 may extend along the derrick 14 to a block and tackle arrangement 24 holding a traveling block 26 that provides a mechanical advantage for raising and lowering the drill string 16 in the wellhead 18. A collar 28 connected to the traveling block 26 may be used to releasably connect the drawworks 12 to the drill string 16. A clutch 30 may releasably connect a drive system 32 to the drum 22 to allow the drive system 32 to rotate the drum 22 to reel in the cable 20. To lower the drill string 16, the clutch 30 may disengage the drive system 32 from the drum 22, and a brake 34 connected to the drum 22 may be released to allow the weight of the drill string 16 and traveling block 26 to rotate the drum 22 to release the cable 20. Using this arrangement, as is well-known in the industry, operation of the drawworks 12 causes the drum 22 to release or retract the cable 20 as desired to raise and lower the drill string 16.

The drill string 16 refers to segments of piping serially connected to extend into the wellhead 18. The drill string 16 may include hundreds of segments, and each segment may be approximately thirty feet in length and weigh several hundred pounds. As shown in FIG. 1, a segment basket 36 may be located near the derrick 14 to provide a staging area for segments 38 to be added to or removed from the drill string 16. A segment hoist 40 may be connected near the top of the derrick 14, and an actuator 42, such as foot pedals or a switch, may be located in the segment basket 36 for operating the segment hoist 40. In this manner, a segment hoist operator 44 may be stationed in the segment basket 36 to operate the segment hoist 40 using the actuator 42. One or more floor operators 46 may be stationed on the floor of the drill rig 10 to connect or disconnect segments 38 from the drill string 16 and operate the drawworks 12 to raise or lower the drill string 16.

As further shown in FIG. 1, a blowout preventer 50 is typically installed around the drill string 16 near the wellhead 18 to quickly isolate or seal the wellhead 18 during an emergency, such as an unexpected high pressure surge from the well. The blowout preventer 50 may include redundant devices, such as pipe rams 52 and shear rams 54, to reduce the flow through or completely sever the drill string 16 to seal off the wellhead 18. The blowout preventer 50 typically has multiple positions, depending on operation of the drawworks 12. In a standby position, the rams 52, 54 are retracted from the drill string 16 to allow the drawworks 12 to raise and lower the drill string 16 without interference from the blowout preventer 50. In a ready position, the rams 52, 54 are biased against or engaged with the drill string 16 to reduce the distance needed to travel to isolate or seal the wellhead 18 during an emergency.

Raising and lowering the drill string 16 typically involves coordinated efforts between multiple operators 44, 46 on the drill rig 10. The repetitive nature of adding and removing segments 38 from the drill string 16, the noise associated with the operations, the weight of the equipment and machinery, and various other personnel and environmental factors create an inherently dangerous operating environment. For example, operation of the drawworks 12 to raise or lower the drill string 16 while the blowout preventer 50 is in the ready position can seriously damage the blowout preventer 50, the rams 52, 54, and/or the drill string 16 engaged by the rams 52, 54, interrupting operations, requiring expensive repairs and training, and leading to lost revenue. Therefore, the need exists for an improved drill rig 10 and method for operating the drill rig 10 that incorporates one or more interlocks to protect the blowout preventer 50, rams 52, 54, and drill string 16 from damage to ensure safe and reliable operation of the drill rig 10.

BRIEF DESCRIPTION OF THE INVENTION

Aspects and advantages of the invention are set forth below in the following description, or may be obvious from the description, or may be learned through practice of the invention.

One embodiment of the present invention is an interlock between a drawworks and a blowout preventer. The interlock includes a means for sensing a position of the blowout preventer. An interlock signal is generated by the means for sensing the position of the blowout preventer, and the interlock signal is reflective of the position of the blowout preventer. A lock operably connected to the drawworks receives the interlock signal and disables operation of the drawworks if the interlock signal meets a predetermined criterion.

An alternate embodiment of the present invention is an interlock for a drill rig that includes a drawworks having a drum operably connected to a drive system and a brake. A cable extends from the drum of the drawworks to a block and tackle arrangement holding a traveling block, and operation of the drawworks causes the drum to release or retract the cable. The interlock includes a blowout preventer and a means for sensing a position of the blowout preventer. An interlock signal generated by the means for sensing the position of the blowout preventer is reflective of the position of the blowout preventer. A lock operably connected to the drawworks receives the interlock signal and disables operation of the drawworks if the interlock signal meets a predetermined criterion.

In yet another embodiment of the present invention, a method for operating a drill rig includes operating a drawworks to raise and lower a drill string and operating a blowout preventer. The method further includes sensing a position of the blowout preventer and generating an interlock signal that reflects the position of the blowout preventer. The method further includes comparing the interlock signal to a predetermined criterion and disabling the drawworks if the interlock signal meets the predetermined criterion.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
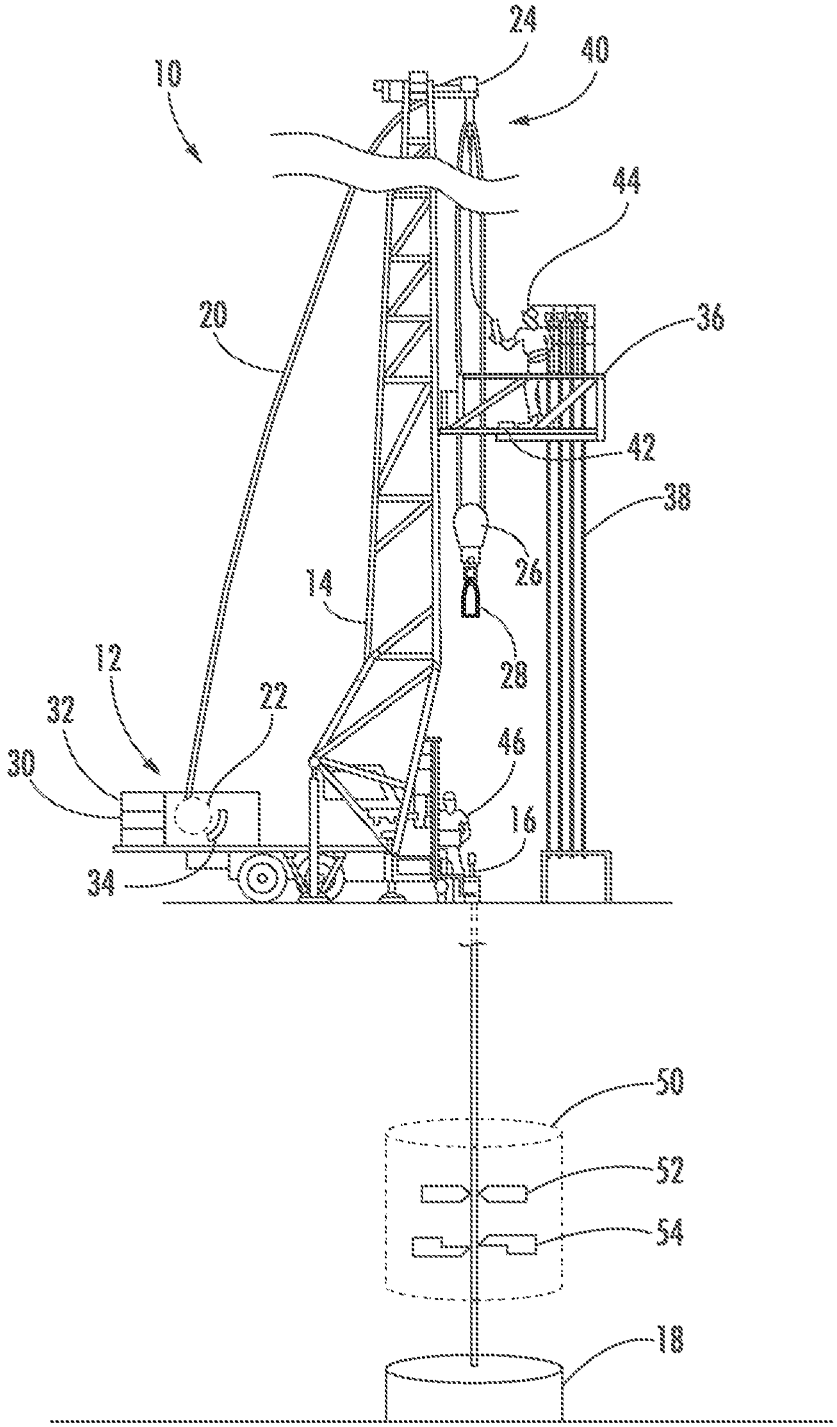
FIG. 1 is a representative drawing of a drill rig with a drawworks.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used in the claims, the definite article "said" identifies required elements that define the scope of embodiments of the claimed invention, whereas the definite article "the" merely identifies environmental elements that provide context for embodiments of the claimed invention that are not intended to be a limitation of the claim.

Figure 2:
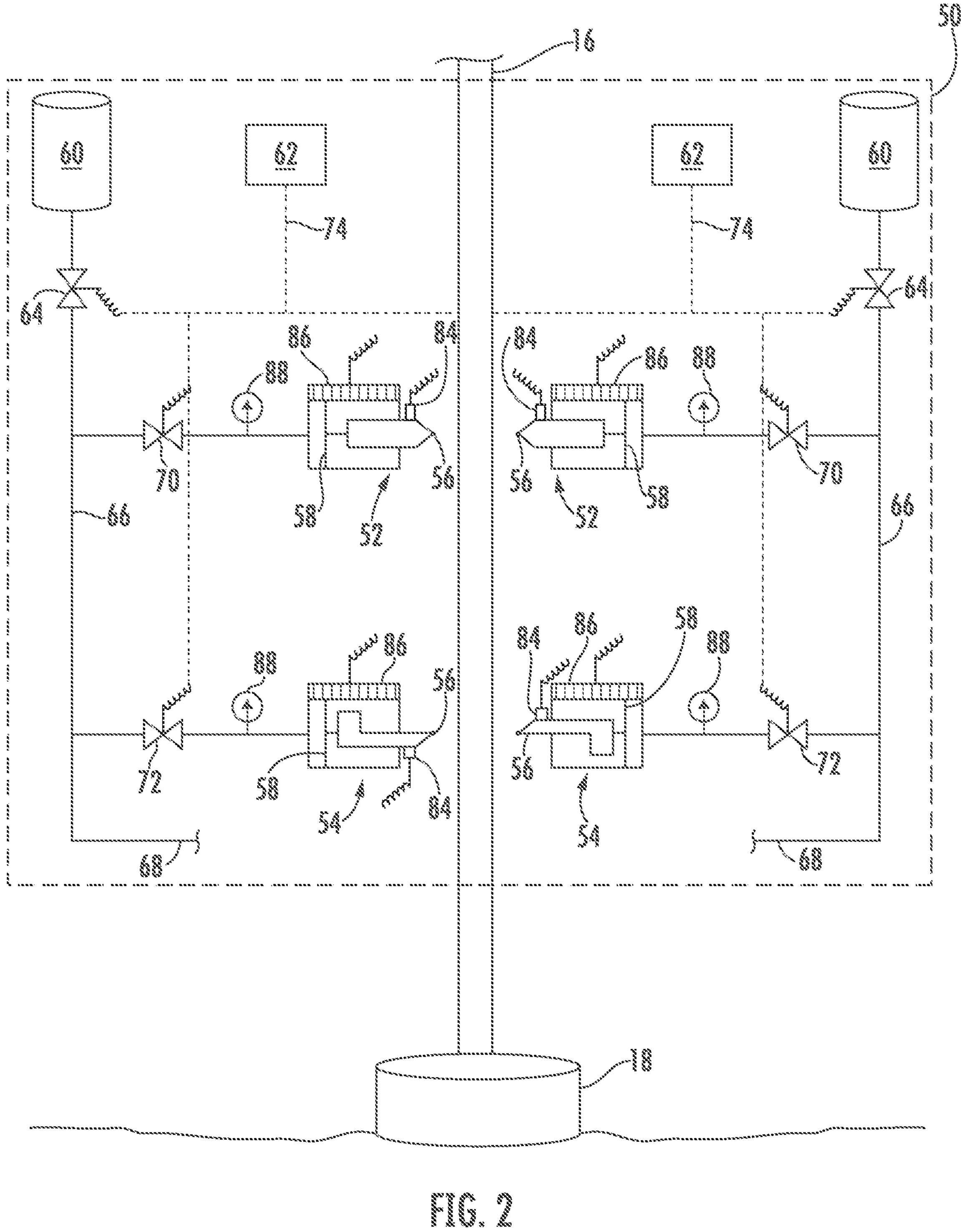
FIG. 2 is a block diagram of an exemplary blowout preventer in a standby position.
Figure 3:
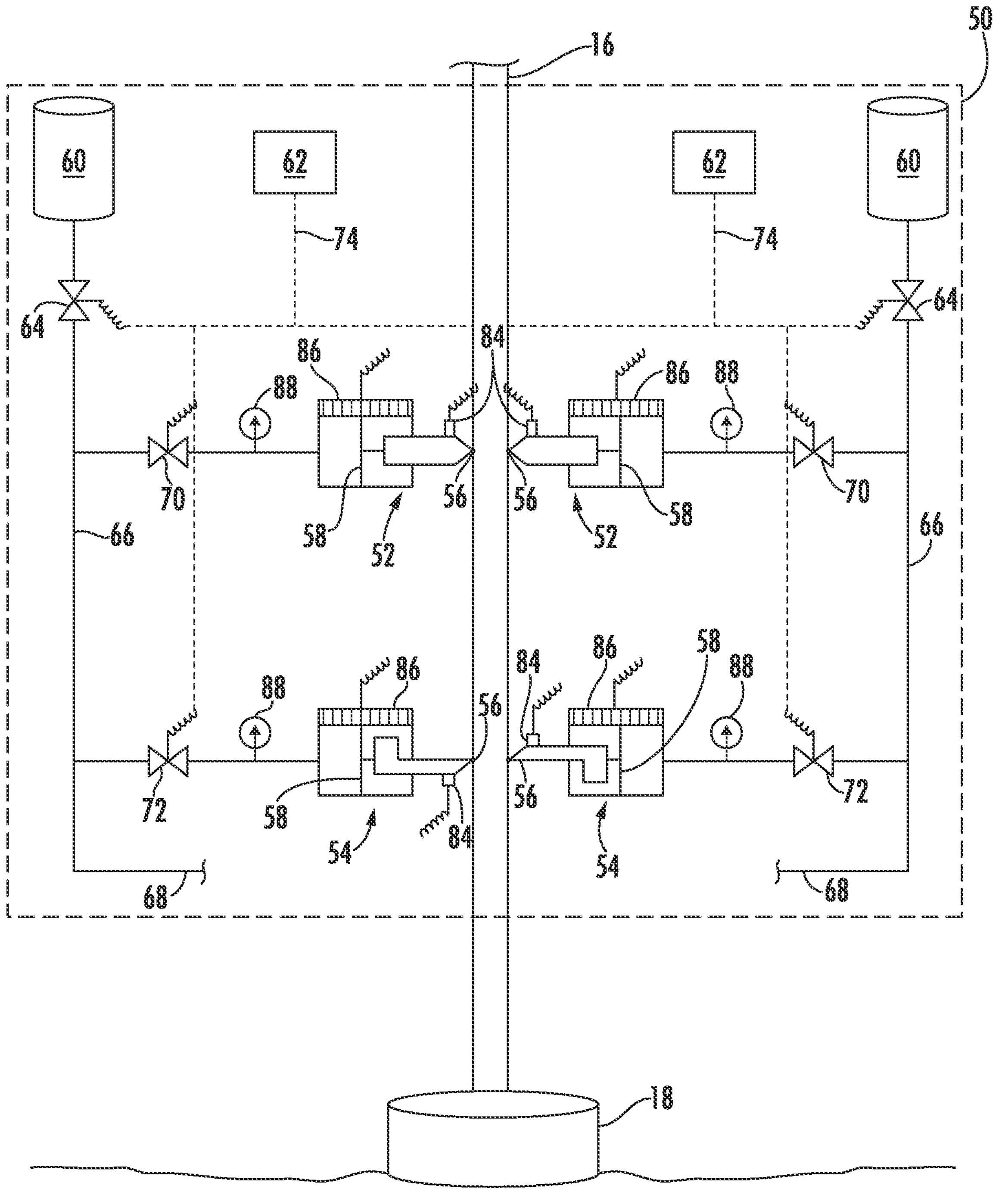
FIG. 3 is a block diagram of the exemplary blowout preventer in a ready position.

Embodiments of the present invention include a drill rig 10 and method for operating the drill rig 10 that incorporate one or more interlocks to ensure safe and reliable operation of the drill rig 10. Referring now to the drawings, wherein identical numerals indicate the same elements throughout the figures, FIGS. 2 and 3 provide block diagrams of an exemplary blowout preventer 50 that may be used with various embodiments of the present invention. FIG. 2 shows the blowout preventer 50 in a standby position with the pipe ram 52 and shear ram 54 retracted from the drill string 16 to allow the drawworks 12 to raise and lower the drill string 16 without interference from the blowout preventer 50. FIG. 3 shows the blowout preventer 50 in a ready position with the pipe ram 52 and shear ram 54 biased against or engaged with the drill string 16 to reduce the distance needed to travel to isolate or seal the wellhead 18 during an emergency.

As shown in FIGS. 2 and 3, the blowout preventer 50 may include redundant components to reliably reduce or seal off flow inside the drill string 16 in an emergency. In the example shown in FIGS. 2 and 3, for example, the pipe ram 52 may reduce flow through the drill string 16, and the shear ram 54 may completely sever the drill string 16 and seal off the wellhead 18. Each ram 52, 54 generally includes a pair of complementary blades 56 made of steel or other suitable material capable of deforming and/or slicing through the drill string 16 to reduce the flow through or completely sever the drill string 16. A piston 58 may be operably connected to each blade 56 to alternately extend each blade 56 toward or retract each blade 56 from the drill string 16.

The blowout preventer 50 may further include redundant accumulators 60, control pods 62, and control valves to selectively control the operation of the rains 52, 54. Each accumulator 60 stores pressurized fluid that may be supplied through an accumulator control valve 64 to a header 66 on each side of the blowout preventer 50. The headers 66 may include a cross-connection 68 so that pressurized fluid from one accumulator 60 may simultaneously pressurize both headers 66. The headers 66 in turn supply the pressurized fluid to a pair of pipe ram control valves 70 and/or shear ram control valves 72. Each control pod 62 actuates the control valves needed to direct the pressurized fluid from one or both accumulators 60 to operate the pipe ram 52 and/or shear ram 54, as desired. For example, either or both control pods 62 may send a signal 74 that opens the accumulator control valves 64 to release pressurized fluid from the accumulators 60 to the headers 66. The signal 74 further opens the pipe ram control valves 70 and/or shear ram control valves 72 to direct the pressurized fluid from the headers 66 to the desired pistons 58 to operate the pipe ram 52 and/or shear ram 54, as desired.

As shown in FIG. 2, the blowout preventer 50 is in the standby position with the header 66 depressurized. As a result, the pipe ram 52 and shear ram 54 are retracted from the drill string 16 to allow the drawworks 12 to raise and lower the drill string 16 without interference from the blowout preventer 50. As shown in FIG. 3, the blowout preventer 50 is in the ready position with the header 66 slightly pressurized. As a result, the pipe ram 52 and shear ram 54 are biased against or engaged with the drill string 16 to reduce the distance needed to travel to isolate or seal the wellhead 18 during an emergency.

Embodiments of the present invention include an interlock 80 between the drawworks 12 and the blowout preventer 50 that disables operation of the drawworks 12 when the blowout preventer 50 is in the ready position. The interlock 80 includes a means 82 for sensing a position of the blowout preventer 50. The function of the means is to sense the position of the blowout preventer 50, e.g., whether the blowout preventer 50 is in a standby position with the rams 52, 54 retracted from the drill string 16 or a ready position with the rams 52, 54 biased against or engaged with the drill string 16. The structure for performing this function may include one or more sensors that monitor one or more components of the blowout preventer 50 to determine the position of the blowout preventer 50. The particular sensor for performing this function may be a reed switch, a photoelectric sensor, a magnetic field sensor, a proximity sensor, a pressure sensor, a position sensor, or any other equivalent sensor known to one of ordinary skill in the art for sensing the position of the blowout preventer 50.

Figure 4:
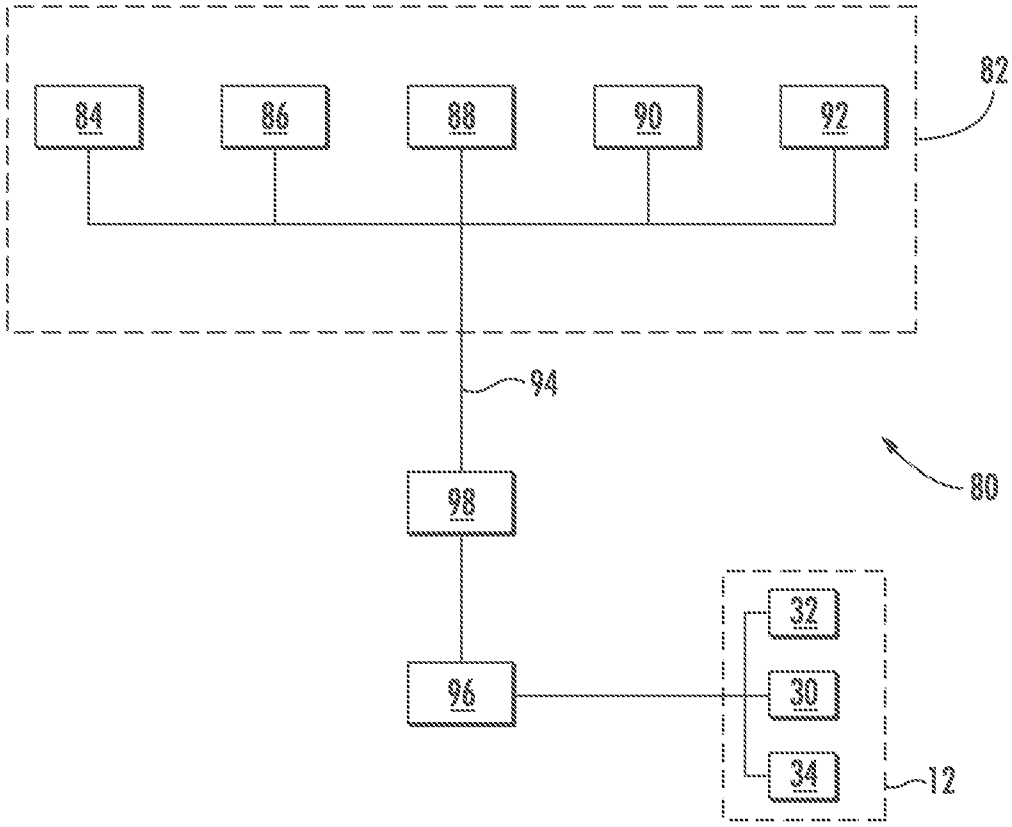
FIG. 4 is a block diagram of interlocks between the drawworks and the blowout preventer according to various embodiments of the present invention.

FIG. 4 provides a block diagram of the interlock 80 between the drawworks 12 and the blowout preventer 50 according to various embodiments of the present invention. In one particular embodiment shown in FIG. 4, for example, the structure for sensing the position of the blowout preventer 50 may be a proximity sensor 84 that senses the distance between one or more blades 56 of the rams 52, 54 and the drill string 16. As shown in FIGS. 2 and 3, the proximity sensor 84 may be attached to or embedded in one or more blades 56 for the rams 52, 54 to detect when the blade 56 is within a predetermined distance from the drill string 16. In this manner, the proximity sensor 84 may detect when the blowout preventer 50 is in any position other than the standby position.

In an alternate embodiment shown in FIG. 4, the structure for the means 82 for sensing the position of the blowout preventer 50 may be a position sensor 86 that senses the position of one or more pistons 58 of the rams 52, 54. As shown in FIGS. 2 and 3, the position sensor 86 may be attached to or embedded in one or more pistons 58 for the rams 52, 54 to detect when the piston 58 has extended more than a predetermined distance, indicating that the blowout preventer 50 is not in the standby position.

In yet another embodiment shown in FIG. 4, the structure for the means 82 for sensing the position of the blowout preventer 50 may be a pressure sensor 88 that senses the pressure in the header 66 and/or one or more pistons 58. As shown in FIGS. 2 and 3, the pressure sensor 88 may be located between each piston 58 and its associated control valve 70, 72 to detect when hydraulic pressure greater than a predetermined pressure is being applied to any piston 58, indicating that the blowout preventer 50 is not in the standby position.

As further shown in FIG. 4, the structure for the means 82 for sensing the position of the blowout preventer 50 may be a valve position indicator 90 associated with one or more of the control valves 64, 70, 72 in the header 66. The valve position indicator 90 may indicate when one of the control valves 64, 70, 72 is open, indicating that pressurized fluid is being applied to one or more rains 52, 54 to move the blowout preventer 50 from the standby position. In yet another embodiment shown in FIG. 4, the structure for the means 82 for sensing the position of the blowout preventer 50 may be a control pod sensor 92 associated with each control pod 62. The control pod sensor 92 may indicate when either control pod 62 has been manually or automatically actuated to place the blowout preventer 50 in any position other than the standby position.

The means 82 for sensing the position of the blowout preventer 50 generates an interlock signal 94 reflective of the position of the blowout preventer 50. For the embodiments shown in FIG. 4 having the proximity sensor 84 and/or position sensor 86, for example, the interlock signal 94 may reflect that one or more blades 56 is not fully in the standby position. Alternately, for the embodiments shown in FIG. 4 having the pressure sensor 88, valve position indicator 90, and/or control pod sensor 92, the interlock signal may reflect one or more conditions or component positions that indicate that the blowout preventer 50 is not in the standby position.

As shown in FIG. 4, the interlock 80 between the drawworks 12 and the blowout preventer 50 further includes a lock 96 operably connected to the drawworks 12 to receive the interlock signal 94 and disable operation of the drawworks 12 if the interlock signal 94 meets a predetermined criterion. The lock 96 may be a valve, switch, solenoid, or other device known to one of ordinary skill in the art that produces an output in response to the predetermined criterion. As shown in FIG. 4, the output from the lock 96 may disable operation of the drawworks 12 by actuating the brake 34, releasing the clutch 30, and/or otherwise disabling the drive system 32.

The predetermined criterion may be selected to prevent operation of the drawworks 12 when the blowout preventer 50 is in any position that may damage the drill string 16 if the drawworks 12 were operated to raise or lower the drill string 16. For example, the predetermined criterion may be any interlock signal 94 that indicates the blowout preventer 50 is in any position other than the standby position. Referring to the embodiments shown in FIGS. 2-4, for example, the lock 96 may disable operation of the drawworks 12 when the interlock signal 94 generated by the proximity sensor 84 and/or position sensor 86 indicates that any blade 56 is too close to the drill string 16. Alternately, the lock 96 may disable operation of the drawworks 12 when the interlock signal 94 generated by the pressure sensor 88, valve position indicator 90, and/or control pod sensor 92 indicates that the blowout preventer 50 has been repositioned from the standby position.

As shown in FIG. 4, the interlock 80 may optionally include a controller 98 operably connected between the means 82 for sensing the position of the blowout preventer 50 and the lock 96 to selectively transmit the interlock signal 94 to the lock 96. The controller 98 may be located, for example, on the drill rig 10 to allow the floor operator 46 to manually interrupt transmission of the interlock signal 94 to the lock 96, or alternately to manually transmit a desired interlock signal 94 to the lock 96, thereby providing a manual override of the interlock 80.

Figure 5:
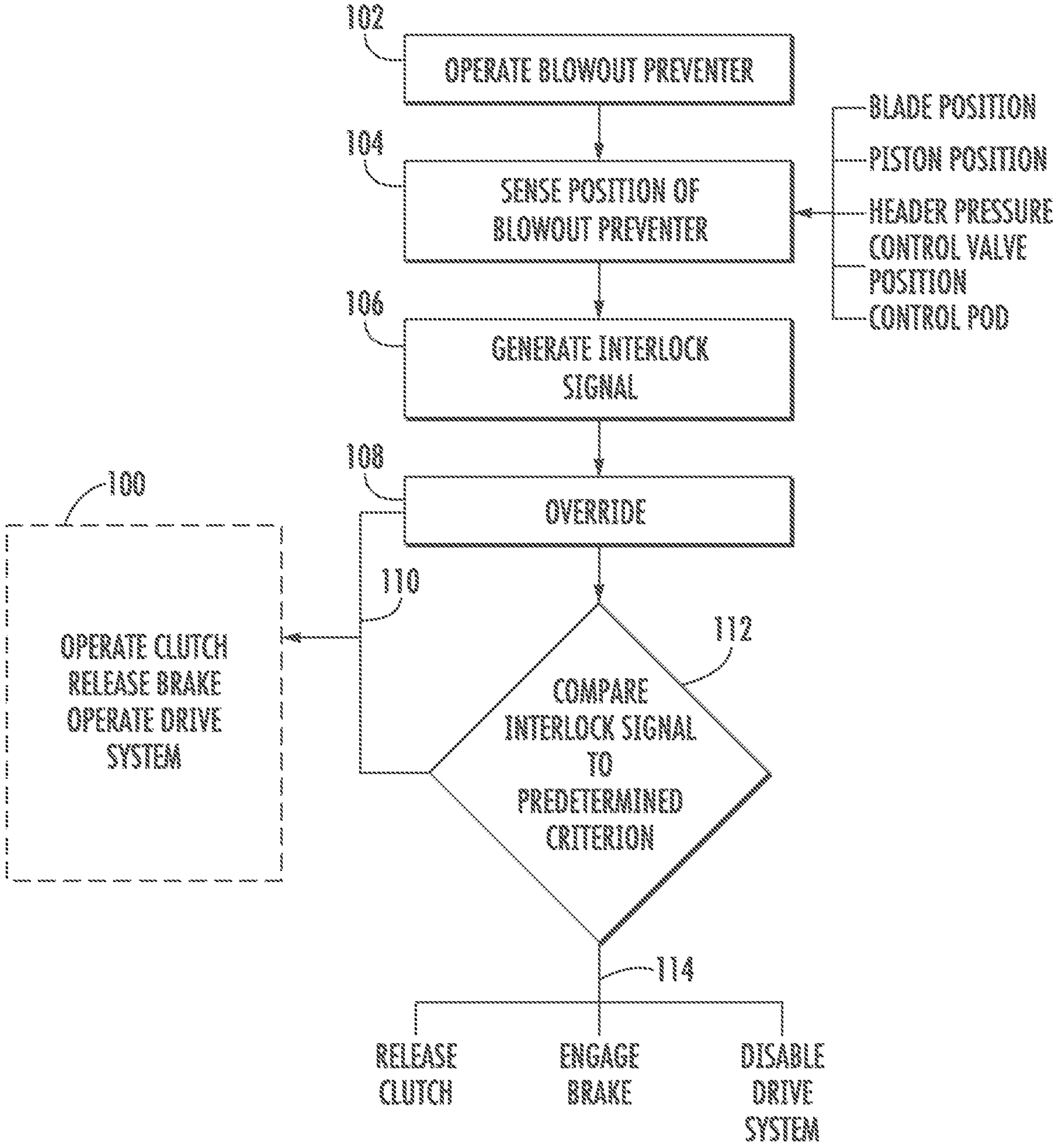
FIG. 5 is a flow diagram of a method for operating the drill rig according to embodiments of the present invention.

FIG. 5 provides a flow diagram of a method for operating the drill rig 10 according to one embodiment of the present invention. Block 100 represents operating the drawworks 12 to raise and lower the drill string 16. As previously described, operating the drawworks 12 involves operating the clutch 30 to releasably connect the drive system 32 to the drum 22, releasing the brake 34 on the drum 22, and operating the drive system 32 to raise or lower the drill string 16.

Block 102 represents operating the blowout preventer 50 to position the blowout preventer 50 to either the disabled position or the ready position. At block 104, the method senses the position of the blowout preventer 50. As previously discussed with respect to FIGS. 2-4, the method may sense, for example, one or more of the position of the blades 56, the position of the pistons 58, the pressure in the header 66, the positions of the control valves 64, 70, 72, and/or actuation of the control pods 62. At block 106, the method generates the interlock signal 94 based on the sensed position of the blowout preventer 50.

Block 108 represents an optional feature of the method to override the interlock 80 by selectively transmitting the interlock signal 94 or modifying the interlock signal 94 to enable or disable the drawworks 12. For example, the floor operator 46 may use the controller 98 to manually interrupt transmission of the interlock signal 94 to enable operation of the drawworks 12, indicated by line 110. Alternately, the floor operator 46 may modify the interlock signal 94 to transmit a desired interlock signal 94 to the lock 96, thereby providing a manual override of the interlock 80.

At block 112, the method compares the interlock signal 94 to the predetermined criterion. The predetermined criterion may be selected to prevent operation of the drawworks 12 when the blowout preventer 50 is in any position that may damage the drill string 16 if the drawworks 12 is operated to raise or lower the drill string 16. For example, the predetermined criterion may be any interlock signal 94 that indicates the blowout preventer 50 is in any position other than the standby position. Referring to the embodiments shown in FIGS. 2-4, for example, the predetermined criterion may be a distance between the blades 56 and the drill string 16, a position of the pistons 58, a pressure in the header 66, a position of the control valves 64, 70, 72, and/or actuation of the control pods 62—any one of which would indicate that the blowout preventer 50 is in any position other than the standby position.

If the comparison between the interlock signal 94 and the predetermined criterion indicates that the predetermined criterion is not met—e.g., the blowout preventer 50 is in the standby position—then the method enables operation of the drawworks 12, as indicated by line 110. If the comparison between the interlock signal 94 and the predetermined criterion indicates that the predetermined criterion is met—e.g., the blowout preventer 50 is in any position other than the standby position—then the method disables operation of the drawworks 12, as indicated by line 114. As shown in FIG. 5, the method may disable operation of the drawworks 12 by disabling the drive system 32, engaging the brake 34, and/or releasing the clutch 30 associated with the drawworks 12.

The interlock 80 and method for operating the drill rig 10 as described and illustrated in FIGS. 1-5 thus provides enhanced safety and protection for both equipment and personnel by preventing inadvertent operation of the drawworks 12 while the blowout preventer 50 is engaged with the drill string 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An interlock between a drawworks and a blowout preventer, the interlock comprising:

a means for sensing a position of the blowout preventer;

an interlock signal generated by said means for sensing the position of the blowout preventer, wherein said interlock signal is reflective of the position of the blowout preventer; and a lock operably connected to the drawworks, wherein said lock receives said interlock signal and disables operation of the drawworks if said interlock signal meets a predetermined criterion.

2. The interlock as in claim 1, wherein the blowout preventer comprises a blade that may be extended or retracted, and said means for sensing the position of the blowout preventer comprises a proximity sensor that senses a position of the blade in the blowout preventer and generates said interlock signal.

3. The interlock as in claim 2, wherein said predetermined criterion is a distance of the blade from a drill string.

4. The interlock as in claim 1, wherein the blowout preventer comprises a piston that may be extended or retracted, and said means for sensing the position of the blowout preventer comprises a position sensor that senses a position of the piston in the blowout preventer and generates said interlock signal.

5. The interlock as in claim 1, wherein the blowout preventer comprises a control pod that controls operation of the blowout preventer, and said means for sensing the position of the blowout preventer comprises a sensor that senses a position of the control pod that controls operation of the blowout preventer and generates said interlock signal.

6. The interlock as in claim 5, wherein said predetermined criterion indicates actuation of the control pod to reposition the blowout preventer from a standby position.

7. The interlock as in claim 1, wherein the drawworks comprises a brake, a clutch, and a drive system, and said lock disables operation of the drawworks by at least one of actuating the brake, releasing the clutch, or disabling the drive system.

8. The interlock as in claim 1, further comprising a controller operably connected between said means for sensing the position of the blowout preventer and said lock, and said controller selectively transmits said interlock signal to said lock.

9. An interlock for a drill rig, comprising:

a drawworks comprising a drum operably connected to a drive system and a brake;

a cable that extends from said drum of said drawworks to a block and tackle arrangement holding a traveling block, wherein operation of said drawworks causes said drum to release or retract said cable;

a blowout preventer;

a means for sensing a position of said blowout preventer;

an interlock signal generated by said means for sensing said position of said blowout preventer, wherein said interlock signal is reflective of said position of said blowout preventer; and a lock operably connected to said drawworks, wherein said lock receives said interlock signal and disables operation of said drawworks if said interlock signal meets a predetermined criterion.

10. The interlock as in claim 9, wherein said blowout preventer comprises a blade that may be extended or retracted, and said means for sensing said position of said blowout preventer comprises a proximity sensor that senses a position of said blade in said blowout preventer and generates said interlock signal.

11. The interlock as in claim 10, wherein said predetermined criterion is a distance of said blade from a drill string.

12. The interlock as in claim 9, wherein said blowout preventer comprises a piston that may be extended or retracted, and said means for sensing said position of said blowout preventer comprises a position sensor that senses a position of said piston in said blowout preventer and generates said interlock signal.

13. The interlock as in claim 9, wherein said blowout preventer comprises a control pod that controls operation of said blowout preventer, and said means for sensing said position of said blowout preventer comprises a sensor that senses a position of said control pod that controls operation of said blowout preventer and generates said interlock signal.

14. The interlock as in claim 13, wherein said predetermined criterion indicates actuation of said control pod to reposition said blowout preventer from a standby position.

15. The interlock as in claim 9, wherein said lock disables operation of said drawworks by at least one of disabling said drive system or actuating said brake.

16. The interlock as in claim 9, further comprising a controller operably connected between said means for sensing said position of said blowout preventer and said lock, and said controller selectively transmits said interlock signal to said lock.

* * * * *